United States Patent
Wang et al.

(10) Patent No.: US 11,551,146 B2
(45) Date of Patent: Jan. 10, 2023

(54) AUTOMATED NON-NATIVE TABLE REPRESENTATION ANNOTATION FOR MACHINE-LEARNING MODELS

(71) Applicant: International Business Machines Corporation, Armonk, NY (US)

(72) Inventors: Xin Ru Wang, San Jose, CA (US); Douglas Ronald Burdick, San Jose, CA (US); Ioannis Katsis, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 336 days.

(21) Appl. No.: 16/848,294

(22) Filed: Apr. 14, 2020

(65) Prior Publication Data

US 2021/0319356 A1    Oct. 14, 2021

(51) Int. Cl.
| | |
|---|---|
| G06F 40/00 | (2020.01) |
| G06N 20/00 | (2019.01) |
| G06F 16/22 | (2019.01) |
| G06F 40/279 | (2020.01) |
| G06F 40/169 | (2020.01) |
| G06V 10/40 | (2022.01) |
| G06F 40/177 | (2020.01) |
| G06Q 10/10 | (2012.01) |
| G06V 30/10 | (2022.01) |

(52) U.S. Cl.
CPC .......... *G06N 20/00* (2019.01); *G06F 16/2282* (2019.01); *G06F 40/169* (2020.01); *G06F 40/177* (2020.01); *G06F 40/279* (2020.01); *G06V 10/40* (2022.01); *G06Q 10/10* (2013.01); *G06V 30/10* (2022.01)

(58) Field of Classification Search
CPC ..... G06F 40/279; G06F 40/177; G06F 40/169
See application file for complete search history.

(56) References Cited

U.S. PATENT DOCUMENTS

| | | | |
|---|---|---|---|
| 7,590,647 | B2 | 9/2009 | Srinivasan et al. |
| 7,668,849 | B1 | 2/2010 | Narancic et al. |
| 8,230,332 | B2 | 7/2012 | Summers et al. |
| 9,870,351 | B2 | 1/2018 | Emanuel et al. |

(Continued)

FOREIGN PATENT DOCUMENTS

CN        103631909 B      1/2017

*Primary Examiner* — Scott T Baderman
*Assistant Examiner* — Barbara M Level
(74) *Attorney, Agent, or Firm* — Ference & Associates LLC (57) ABSTRACT

One embodiment provides a method, including: receiving two documents, one of the two documents having at least one table that includes the same information as a corresponding table in the other of the two documents, wherein (i) one of the two documents comprises the at least one table in an unstructured table representation and (ii) the other of the two documents comprises the at least one table in a structured table representation; identifying text elements within the at least one table in the unstructured table representation; matching the identified text elements with table elements within the at least one table in the structured table representation; and annotating the at least one table in the structured table representation based upon the matches between the table elements and text elements.

22 Claims, 5 Drawing Sheets

(56) References Cited

U.S. PATENT DOCUMENTS

| | | |
|---|---|---|
| 10,261,942 B2 | 4/2019 | Mackay et al. |
| 2004/0193520 A1 | 9/2004 | LaComb et al. |
| 2014/0006369 A1* | 1/2014 | Blanchflower ... G06F 16/90344 707/706 |
| 2016/0055376 A1* | 2/2016 | Koduru ................ G06V 30/412 382/176 |
| 2017/0091162 A1* | 3/2017 | Emanuel ............... G06F 40/169 |
| 2018/0349693 A1* | 12/2018 | Watanabe ............ G06V 30/416 |
| 2019/0019022 A1* | 1/2019 | Marda .................. G06V 30/418 |
| 2019/0340240 A1* | 11/2019 | Duta ................... G06V 30/412 |

* cited by examiner

| Asset | Basis | Estimated Useful Life |
|---|---|---|
| Buildings | Diminishing Balance | 5 to 40 Years |
| Third-Party Storage | Double-Declining | 3 to 40 Years |
| Equipment and other Hardware | Double-Declining | 4 to 10 Years |
| Office Equipment | Diminishing Balance | 3 to 5 Years |
| Building Improvements | Straight-Line | Over shorter of estimated useful life or lease term |
| Construction Equipment | Units of Production | 3 to 20 Years |

300A

| Asset | Basis | Estimated Useful Life |
|---|---|---|
| Buildings | Diminishing Balance | 5 to 40 Years |
| Third-Party Storage | Double-Declining | 3 to 40 Years |
| Equipment and other Hardware | Double-Declining | 4 to 10 Years |
| Office Equipment | Diminishing Balance | 3 to 5 Years |
| Building Improvements | Straight-Line | Over shorter of estimated useful life or lease term |
| Construction Equipment | Units of Production | 3 to 20 Years |

| Asset | Basis | Estimated Useful Life |
|---|---|---|
| Buildings | Diminishing Balance | 5 to 40 Years |
| Third-Party Storage | Double-Declining | 3 to 40 Years |
| Equipment and other Hardware | Double-Declining | 4 to 10 Years |
| Office Equipment | Diminishing Balance | 3 to 5 Years |
| Building Improvements | Straight-Line | Over shorter of estimated useful life or lease term |
| Construction Equipment | Units of Production | 3 to 20 Years |

401A — Estimated Useful Life

400B

| Asset | Basis | Estimated Useful Life |
|---|---|---|
| Buildings | Diminishing Balance | 5 to 40 Years |
| Third-Party Storage | Double-Declining | 3 to 40 Years |
| Equipment and other Hardware | Double-Declining | 4 to 10 Years |
| Office Equipment | Diminishing Balance | 3 to 5 Years |
| Building Improvements | Straight-Line | Over shorter of estimated useful life or lease term |
| Construction Equipment | Units of Production | 3 to 20 Years |

401B — Estimated  
402B — Useful Life

AUTOMATED NON-NATIVE TABLE REPRESENTATION ANNOTATION FOR MACHINE-LEARNING MODELS

BACKGROUND

Deep learning models are a type of machine learning model whose training is based upon learning data representations as opposed to task-specific learning. In other words, deep or machine learning is the ability of a computer to learn without being explicitly programmed to perform some function. Thus, machine learning allows a programmer to initially program an algorithm that can be used to predict responses to data, without having to explicitly program every response to every possible scenario that the computer may encounter. In other words, machine learning uses algorithms that the computer uses to learn from and make predictions with regard to data. Machine learning provides a mechanism that allows a programmer to program a computer for computing tasks where design and implementation of a specific algorithm that performs well is difficult or impossible.

To implement machine learning, models or training datasets are created to train the machine-learning model. The training datasets are then provided to the machine-learning model to effectively teach the model regarding how the model should react to different types of data. As the machine-learning model is presented with more and more data, the model is able to make predictions with respect to new data that the model has never digested or been presented with before. The datasets may also be used to test a machine-learning model to ensure that the machine-learning model is performing as expected.

BRIEF SUMMARY

In summary, one aspect of the invention provides a method, comprising: receiving two documents, one of the two documents having at least one table that includes the same information as a corresponding table in the other of the two documents, wherein (i) one of the two documents comprises the at least one table in an unstructured table representation and (ii) the other of the two documents comprises the at least one table in a structured table representation; identifying text elements within the at least one table in the unstructured table representation; matching the identified text elements with table elements within the at least one table in the structured table representation; and generating an annotated version of the at least one table in the structured table representation by annotating the at least one table in the structured table representation based upon matches between the table elements and the identified text elements, wherein the annotating comprises adding tags to the at least one table in the structured table representation that identify a location of the corresponding text element within the at least one table in the unstructured table representation.

Another aspect of the invention provides an apparatus, comprising: at least one processor; and a computer readable storage medium having computer readable program code embodied therewith and executable by the at least one processor, the computer readable program code comprising: computer readable program code configured to receive two documents, one of the two documents having at least one table that includes the same information as a corresponding table in the other of the two documents, wherein (i) one of the two documents comprises the at least one table in an unstructured table representation and (ii) the other of the two documents comprises the at least one table in a structured table representation; computer readable program code configured to identify text elements within the at least one table in the unstructured table representation; computer readable program code configured to match the identified text elements with table elements within the at least one table in the structured table representation; and computer readable program code configured to generate an annotated version of the at least one table in the structured table representation by annotating the at least one table in the structured table representation based upon matches between the table elements and the identified text elements, wherein the annotating comprises adding tags to the at least one table in the structured table representation that identify a location of the corresponding text element within the at least one table in the unstructured table representation.

An additional aspect of the invention provides a computer program product, comprising: a computer readable storage medium having computer readable program code embodied therewith, the computer readable program code executable by a processor and comprising: computer readable program code configured to receive two documents, one of the two documents having at least one table that includes the same information as a corresponding table in the other of the two documents, wherein (i) one of the two documents comprises the at least one table in an unstructured table representation and (ii) the other of the two documents comprises the at least one table in a structured table representation; computer readable program code configured to identify text elements within the at least one table in the unstructured table representation; computer readable program code configured to match the identified text elements with table elements within the at least one table in the structured table representation; and computer readable program code configured to generate an annotated version of the at least one table in the structured table representation by annotating the at least one table in the structured table representation based upon matches between the table elements and the identified text elements, wherein the annotating comprises adding tags to the at least one table in the structured table representation that identify a location of the corresponding text element within the at least one table in the unstructured table representation.

A further aspect of the invention provides a method, comprising: receiving two representations of at least one table, wherein one of the two representations comprises a non-native table representation and wherein the other of two representations comprises a native table representation, wherein the non-native table representation comprises a table in an unstructured format and wherein the native table representation comprises a table in a structured format; identifying text tokens comprising text within the non-native table representation; matching the identified elements with table tokens of the table within the native table representation, wherein the matching comprises identifying text tokens having text matching table tokens; and adding tags to the table tokens within the native table representation, wherein a given tag identifies a location of a text token within the non-native table representation corresponding to the table token having the given tag.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an example embodiment, most if not all of the process steps, components and outputs discussed with respect to FIGS. 1-4 can be performed or utilized by way of a processing unit or units and system memory such as those indicated, respectively, at 16' and 28' in FIG. 5, whether on a server computer, a client computer, a node computer in a distributed network, or any combination thereof.

Training datasets are created to train a machine-learning model, also referred to as a deep-learning model. The training datasets include data and an indication of the desired result corresponding to the data, which is called a label or annotation. For example, if the machine-learning model is an image classifier, the training dataset will include images and a classification of the images. As an example, if the machine-learning model is to identify types of animals within images, one training datum may be an image of a horse that is labeled or annotated as such. As another example, if the machine-learning model is a text classifier, the training dataset will include text and labels for the text which indicate how the text should be classified.

The same datasets that are used for training a machine-learning model can also be used to test the machine-learning model. When using the dataset for testing the machine-learning model, the labels or annotations are not provided to the machine-learning model. Rather, the unlabeled data are provided to the machine-learning model and the output of the machine-learning model is compared against the labels. The comparison indicates if the machine-learning model is correctly classifying data, thereby testing the machine-learning model.

The problem with the training or testing datasets is that compiling the datasets is very time intensive. It is very time consuming to collect the data for the dataset and annotate or label the data. Traditionally, annotation and labeling the data is a manual process where a user views each datum within the dataset and manually annotates or labels the datum. The user then moves to the next datum and performs the same operation. Since the training/testing datasets need to include a large amount of data to accurately train or test the model, this manual process takes a significant amount of time. Additionally, the process is generally very tedious so it is very prone to human error. Errors with the labeling and annotations result in the machine-learning model being trained or tested with incorrect data. This results in either an inaccurate machine-learning model that incorrectly classifies data or identifying a machine-learning model as being more or less accurate than it really is.

Accordingly, there have been efforts to automate, at least partially, the creation of the training/testing datasets. However, some classifications are particularly difficult for generating datasets. For example, identifying table elements may be difficult, particularly when the table elements are within a document that does not support a native table representation. A native representation is also referred to as a structured format because the information is contained within fields that are known to the underlying application. In other words, the underlying application or programming designates fields where information is placed. Thus, when accessing the programming, the system can identify each table element as a table element. In other words, in a document supporting a native table representation, the code or programming associated with the document identifies table elements, for example, header, table cells, location of elements within the table, and the like.

On the other hand, a non-native table representation is also referred to as an unstructured format because the information is effectively free-form without any designation of fields from the perspective of the underlying application or programming. Thus, in a document that does not support a native table representation, the code or programming associated with the document does not have any table identifiers. Rather, the elements within the table are simply represented by letters and do not provide any identification that these elements are actually part of a table. An example document that does not support native table representations is a PDF document. In a PDF document the tables are simply coded as letters and positions or coordinates of the letters on the page. Thus, within the code or programming, there is no identification or indication that these letters exist in a table at all.

While a human can easily identify these elements as belonging to a table, a computer, processor, or machine cannot. Thus, if a machine-learning model is designed to classify text or table elements, the machine-learning model cannot utilize the code associated with the document to identify elements as belonging to a table or the type of table element (e.g., header, caption, cell contents, etc.). Thus, in order for the machine-learning model to correctly classify this information, the machine-learning model has to be presented with properly compiled datasets that provide labels for these tables. However, as discussed above, compiling these datasets is very time-consuming and error-prone. Conventional techniques do not provide a method for automating the compilation of table training/testing datasets, particularly for those documents that do not support a native table representation.

Accordingly, an embodiment provides a system and method for generating table datasets for machine-learning models by automatically annotating table elements utilizing a non-native table and a matching native table format. The system receives two documents, each having a table that includes the same information. One of the documents provides the table in a non-native representation and the other document provides the table in a native representation. The tables do not have to be the exactly the same, but the information contained therein is substantially the same. In other words, the tables may have different formatting, but the information remains the same. In the non-native table, also referred to as an unstructured table representation, the system identifies the text elements within the table. Since the native table, also referred to as a structured representation, already provides indicators for different table elements, the system does not have to identify text elements within that format.

The system matches the text elements of the unstructured table with the table elements of the structured table. The system may start with the first text element in the unstructured table and determine if the first table element matches. If the first table element does not match, the system determines if the next table element matches. The system continues on until a match is found or a predetermined number of table elements are checked. If an exact match is not found, the system determines whether one of the text elements was either over or under aggregated. Over aggregated means that more than one text element was combined into a single text element. Under aggregated means that a text element that should have been recognized as a single text element was recognized as more than one text element. Once the system has identified matches between the text elements and the table elements, the system generates an annotated version of the structured table by annotating or labeling the table with tags that identify a location of the corresponding text element within the unstructured table. This dataset can then be utilized either as a training or a test dataset for a machine-learning model.

Such a system provides a technical improvement over current systems for annotating tables for machine-learning models. Rather than requiring manual annotation or labeling of tables, the described system and method can automatically generate the datasets which can then be used to train or test a machine-learning model. This is particularly useful for annotating tables that are in documents that do not support native table representations. The system can create the dataset by utilizing documents that have tables with matching information, where in one of the documents the table is represented in a native representation and in the other document the table is represented in a non-native representation. Using the native representation, the system can identify the location of the same table elements within the non-native representation. These locations can then be used to generate tags or labels that can be added to the document having the native representation, which can then be used in generating the training/testing dataset for the machine-learning model. Thus, the described system and method provides a technique for automating the generation of training/testing datasets for tables, thereby reducing the amount of time required for generating these datasets and minimizing the amount of error that is introduced with the conventional manual techniques.

Figure 1:
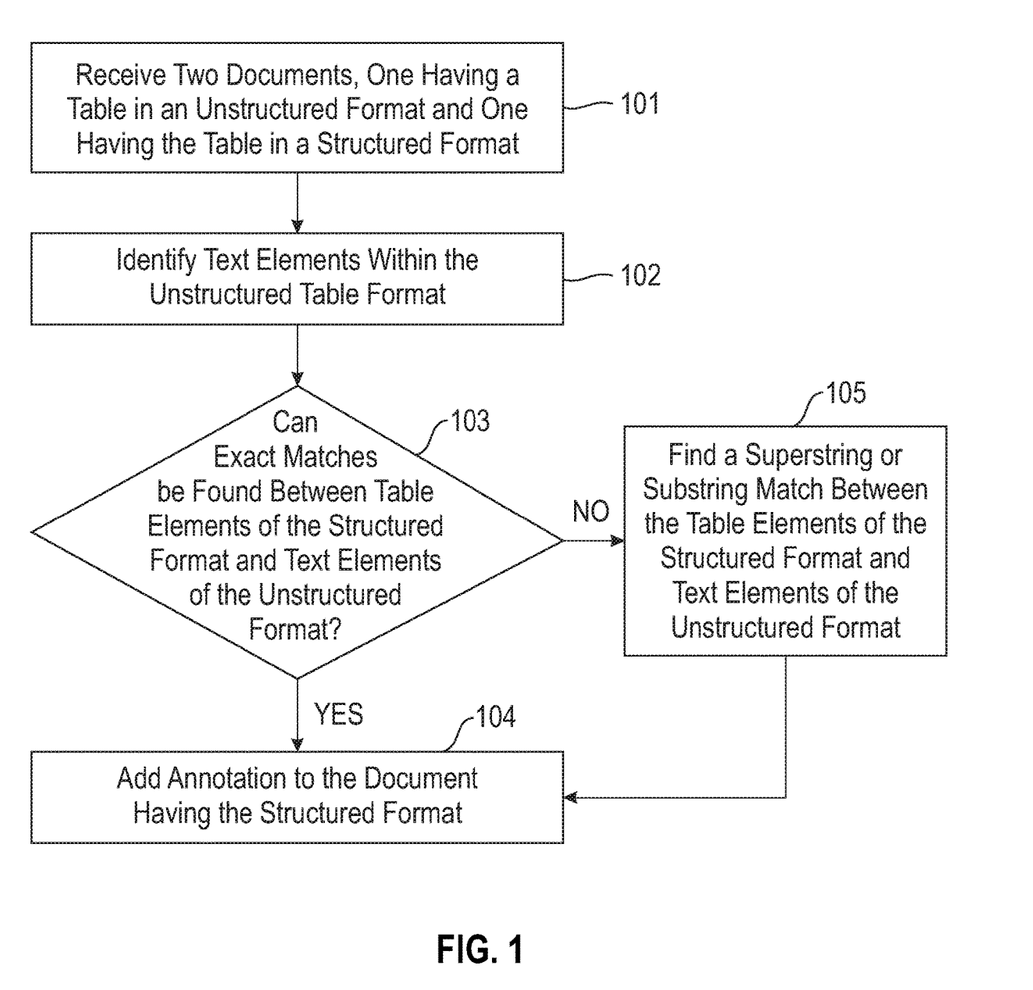
FIG. 1 illustrates a method of generating table datasets for machine-learning models by automatically annotating table elements utilizing a non-native table and a matching native table format.

FIG. 1 illustrates a method for generating table datasets for machine-learning models by automatically annotating table elements utilizing a non-native table and a matching native table format. At 101 the system receives two documents. The two documents may be of different formats. For example, one document may be a PDF format which does not support native table representations, whereas the other document is an HTML or word processing document format which does support native table representations. Within each of the documents is a table containing the same information between the two documents. The documents themselves do not have to be exact matches. For example, one document may be a different revision of the other document, but including the same table. As another example, the documents may be different documents and have different content, except that a table within one document was copied to the other document. The tables between the two documents received at 101 need to include substantially similar or the same information. The format of the tables, however, may be different. For example, some cell contents may be on separate lines in one table but a single line in the other table. As another example, the spacing between columns may be different between the two tables. As a further example, the colors or lines used to delineate the table may be different colors, different widths, different styles, or the like, between the two documents.

Since the documents are of different formats, the programming or code associated with the documents and, therefore, the tables is also different. Thus, one of the documents supports native table representations, also referred to as structured table representations, and the other document does not support native table representations, also referred to as unstructured table representations. Accordingly, the table in one of the documents is represented in a native table representation and the table in the other document is represented in a non-native table representation. For ease of readability, the document supporting the native table representations will be referred to as the native or structured document and the corresponding table will be referred to as a native or structured table. The document not supporting the native table representations will be referred to as the non-native or unstructured document and the corresponding table will be referred to as a non-native or unstructured table.

In a native table representation the tables and table content are identified within the programming or code associated with the underlying application. Thus, if a computer or machine accesses the code, the computer can identify what elements within the code correspond to a table, the table element type (e.g., header, caption, cell content, etc.), and where in the table the elements are located. In other words, each of elements within the table is in a structured format where each element corresponds to a known field. On the other hand, in a non-native table representation the tables and table content are not identified within the programming or code associated with the underlying application. Thus, if a computer or machine accesses the code, the computer cannot distinguish between an element within a table and another element. In other words, each of the elements within the table is in an unstructured format where each element does not have a corresponding known field.

At 102 the system identifies text elements within the non-native table. Identifying the text elements includes identifying where character strings start and end. In other words, in identifying the text elements the system is grouping characters into words, phrases, sentences, or other logical groupings. In the case where the non-native document or table is represented as an image or other format where characters are not identified, identifying the text elements may include converting the non-native table or document into machine text, for example, using an optical character recognition technique. Once the table and/or document is converted into machine text, the system can identify the text elements within the non-native table. For ease of readability, the elements of the non-native table will be referred to as text elements. The text elements are contrasted with the table elements which will be the term used to refer to the elements within the native table. Other than the term used to distinguish the two table formats, the text elements and table elements effectively represent the same thing, specifically, elements within a table. Thus, the text or table elements may include any element within the table, for example, the table header, table caption, table contents, row header, column header, table notes, or the like.

At 103 the system determines if text elements of the unstructured table can be matched with table elements of the structured table. Within the matching step, the system may first sort the text elements. When sorting the text elements, the system may sort the text elements in a reading direction, meaning the text elements are sorted and listed as they are encountered when a person is reading. Thus, the text element that occurs at the left-top of the document page will be listed first. The text element occurring to the adjacent right of the first text element will be listed second. The system continues to sort the text elements moving from left to right within a line of the document and then from top to bottom within the document. Thus, the text elements are sorted in a reading direction, from left to right and then top to bottom. It should be remembered that within the unstructured document, the system does not know if a text element belongs to a table or is part of the underlying document. Thus, text elements included in the matching may not correspond to a table at all.

In a first pass, the system attempts to determine if exact matches can be made between the text elements and the table elements. To determine if a text element matches a table element the system may utilize one or more similarity techniques, for example, similarity measures, cosine similarity, clustering techniques, affinity measurements, class distribution measures, and the like. While the system may attempt to find an exact match between characters in the text element and characters in the table element, the system may also use fuzzy matching. Fuzzy matching allows for the system to account for any transcription or conversion errors. For example, fuzzy matching may be utilized when the unstructured document is converted into machine text to account for any errors that may have occurred during the conversion.

When performing the matching, the system may select the first table element occurring within the structured document. The system then compares this table element to the first text element, for example, the first text element occurring in the sorted list. If the text elements are not sorted, then the system may compare the first table element to the first text element that is encountered within the document in a reading direction. If the table element does not match the text element, the system may mark the text element as "tried" or "already tried" or something else to identify that the text element has already been compared to this table element. The system then moves to the next occurring text element and compared the table element with this text element. This continues until a match is found or a predetermined number of lines within the unstructured document have been tried.

The predetermined number of lines may be a default number of lines or may be set by a user. Since a table could contain the same element more than once, setting a predetermined number of lines can reduce the chance of mismatching elements. A mismatch would occur if the table element is matched with a text element that is not in the same location within the table. Thus, even though the words may be the same between the two matching elements, matching a table element occurring in the first row, second column with a text element having the same words occurring in the seventh row, second column would be considered a mismatch. If an exact match, meaning the same characters or words, accounting for any conversion errors, occurs within a table element and a text element, is found for a table element at 103, the system adds an annotation to the table element at 104. The annotation or label includes an identification of the location or position within the unstructured document where the matching text element is located. The location may include the coordinate location. The system then moves to the next unmatched table element and the next unmatched text element to determine if further matches can be made.

Figure 2:
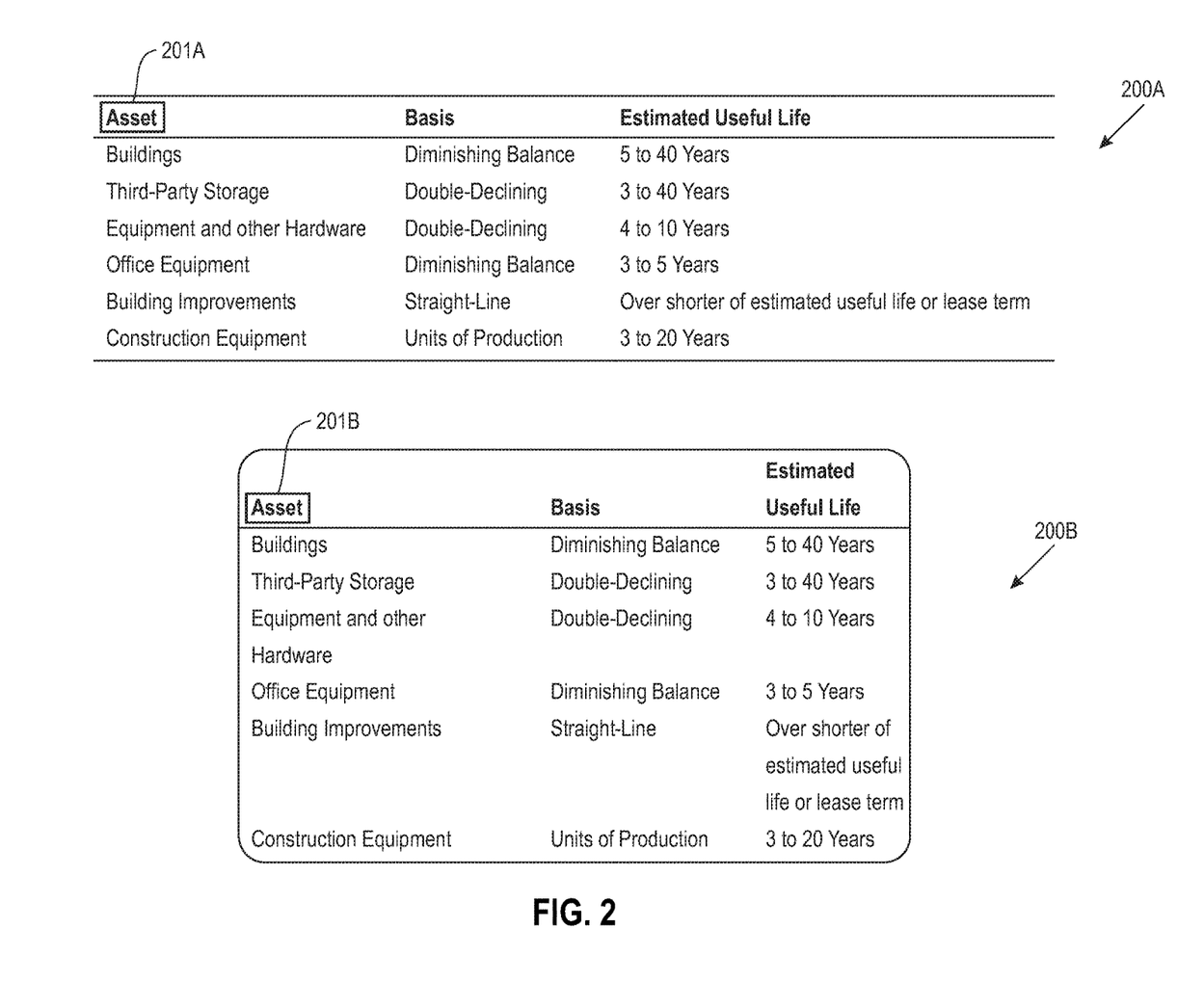
FIG. 2 illustrates an example exact match between a non-native table format and a native table format.

FIG. 2 illustrates an example exact match. Native table 200A and non-native table 200B contain the same information. However, as seen in the example of FIG. 2, the formatting between the tables is different. For example, the header for the last column is on a single line in the native table 200A, but is on two lines in the non-native table 200B. When performing the matching, the system started with the first table element 201A, which is "Asset". Upon comparing the first table element 201A with the first text element 201B, "Asset", the system determines there is an exact match. Thus, the system then annotates native table 200A, element "Asset" 201A, with the location or position of the text element "Asset" 201B.

If, on the other hand, an exact match cannot be found at 103, the system determines whether a superstring or substring match can be found between the table element and a text element. Since the text occurring within the unstructured document does not have any identifiers, the system may incorrectly identify text elements. In other words, the system may incorrectly group characters or words into one or more text elements. The first incorrect grouping the system looks for when making matches is a superstring text element. A superstring text element is a text element that incorrectly includes more than one text element. For example, if the system groups characters into text elements based upon spacing between characters, when a spacing between columns is less than or equal to the character spacing, the system may incorrectly group characters into a single text element that actually belong to two separate columns.

Figure 3:
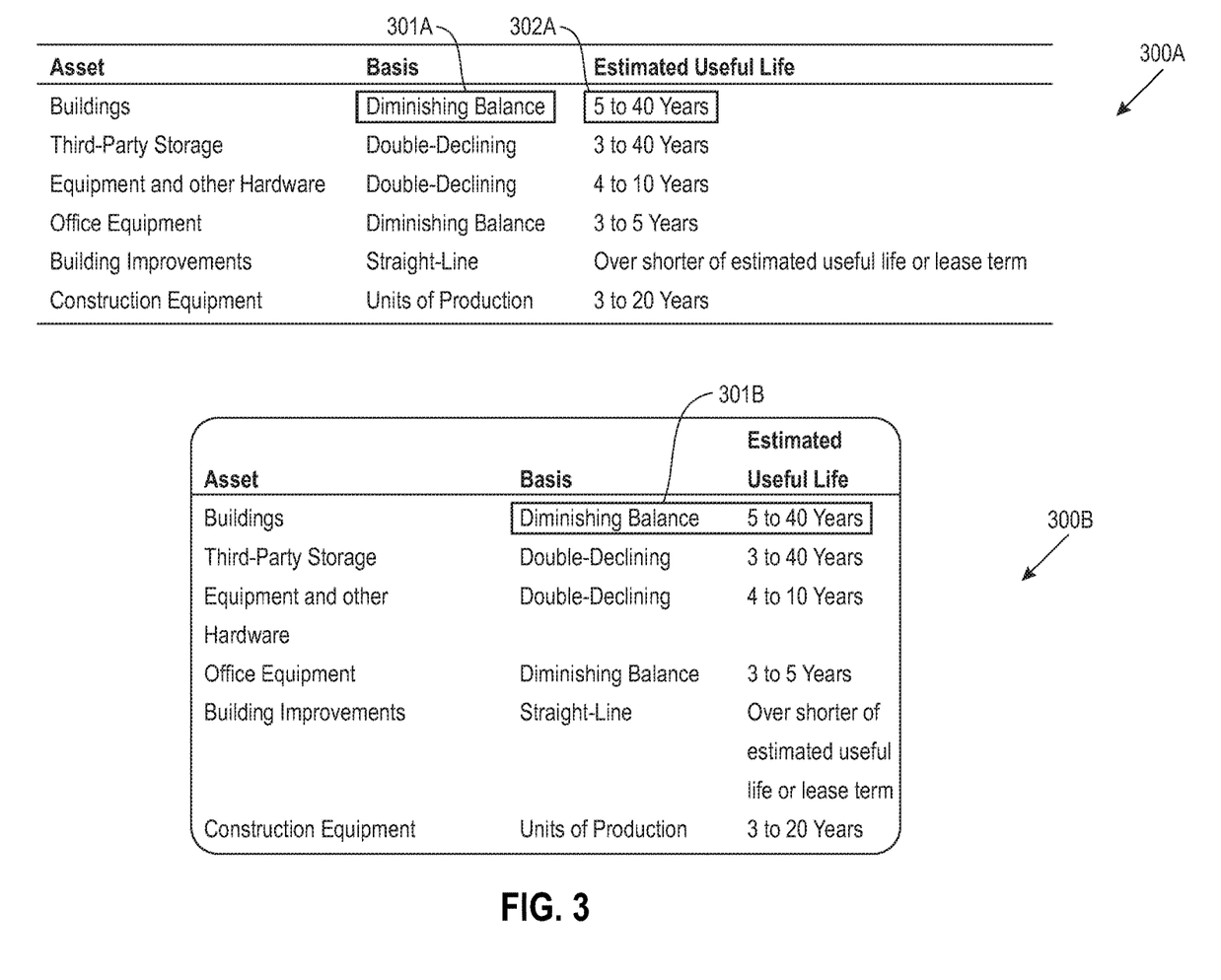
FIG. 3 illustrates an example of a combined cell between a non-native table format and a native table format.
Figure 4:
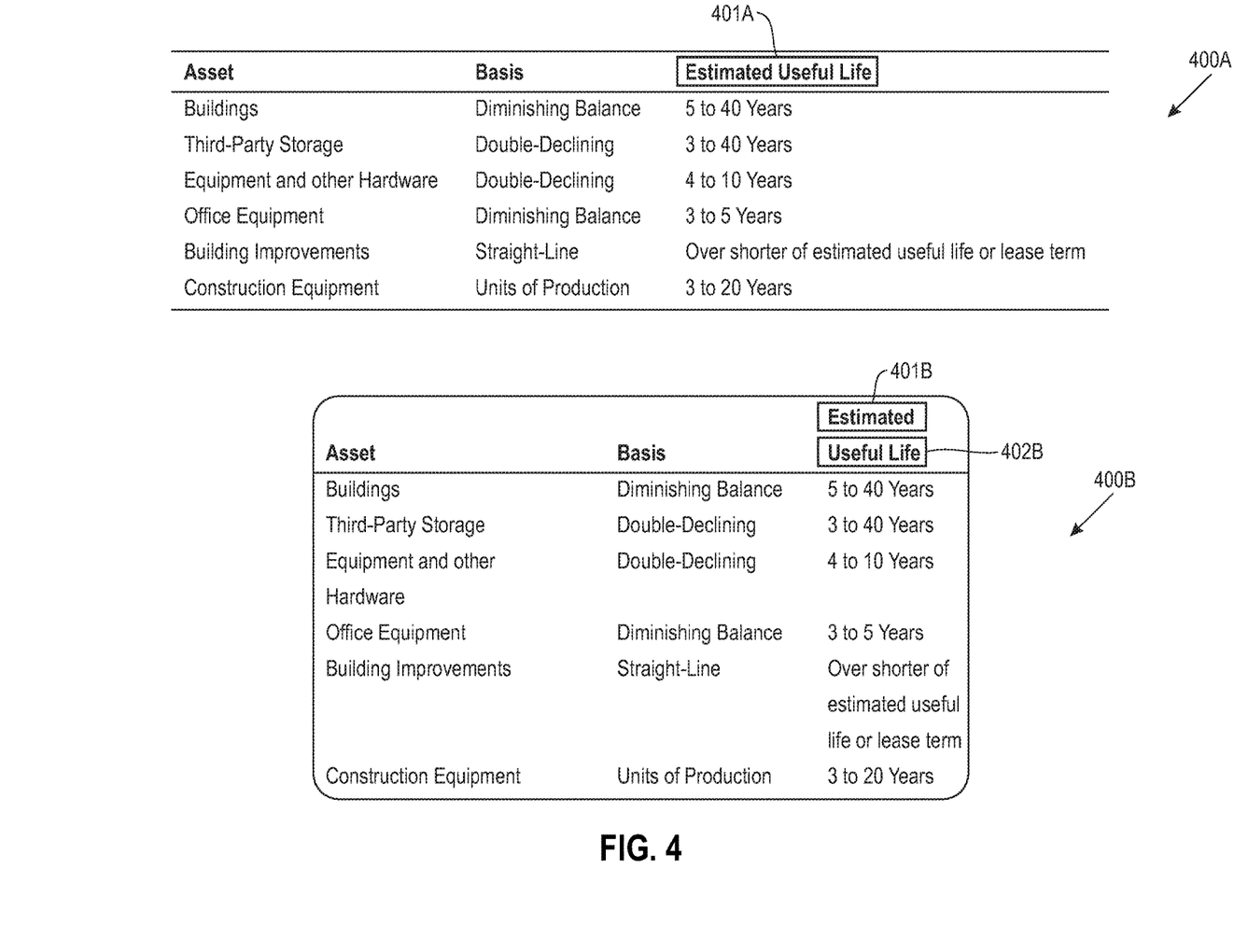
FIG. 4 illustrates an example of a split cell between a non-native table format and a native table format.

An example of a superstring is shown in FIG. 3. The tables illustrated in FIGS. 2-4 are the same tables. However, different table and text elements are being distinguished in each table to illustrate the different matching techniques. As shown in FIG. 3 in the non-native table 300B, the text element 301B is a superstring text element. This text element 301B should have been identified as two separate text elements, "Diminishing balance" and "5 to 40 years." Instead, the system identified this as a single text element "Diminishing balance 5 to 40 years." Thus, when the system attempted to match the table element "Diminishing balance" 301A of the native table 300A, the system did not find an exact match.

Once the system identifies that an exact match cannot be found, the system attempts to determine if a superstring match can be found. The system first unmarks or un-designates any of the unmatched text elements that have been marked as already tried. This allows the system to compare the table elements to these text elements again. When making the second comparison, instead of trying to find an exact match, the system compares the table element with text elements and determines if a portion of the text element matches the table element. If a portion of a text element matches the table element, the system splits the text element at the portion matching the table element. In other words, the system re-identifies the text element as a first portion that matches the table element and as a second portion which is now unmatched. Using the example of FIG. 3, the system would split text element 301B into "Diminishing balance" because that matches the table element 301A, and would identify the remaining portion "5 to 40 years" as a second text element. In this case, when table element 302A is attempted to be matched, an exact match would now be found with this new second, unmatched text element.

If an exact match cannot be found and a superstring match cannot be found, the system attempts to determine if a substring match can be found. A substring text element is a text element that is incorrectly split. In other words, the system has identified two or more text elements, where a single text element should have been identified. This may occur in an example where the system identifies text elements by line and an element that should be a single text element is represented on two lines. An example substring text element is illustrated in FIG. 4. The table element 401A within the native table 400A is "Estimated useful life". In the non-native table 400B, the system has identified one text element as "Estimated" 401B and another text element as "useful life" 402B. Thus, the complete element 401A has been incorrectly identified and split into two separate text elements 401B and 402B.

As with the superstring matching, the system first unmarks or un-designates any text elements that have been marked or designated as already tried, in either the exact matching comparison or the superstring matching comparison. The system then finds a text element that is a subset of the current table element that the system is trying to match. In other words, the system attempts to identify if a text element matches a portion of the table element. If the system finds a text element that matches a portion of the table element, the system then attempts to find one or more text elements that match the remaining portion(s) of the table element. Once the entire table element is matched with text elements, the system combines the text elements that have been matched with the table element into a single text element and marks it as matched.

Since a table may include the same string of characters in multiple locations, the substring matching may become complicated in that there may be multiple text elements that match the table element, particularly since only a portion of the table element has to be matched. Thus, when attempting to find text elements that match a new portion of the table element, the system also does a comparison of the already matched table element portions. This allows the system to find new text elements which match better with the portion of the table element. In the case that a new text element that matches an already matched table element portion is found, the system then compares the location or proximity of the text elements to text elements matching the other table element portions. The matching text element matching the table element portion that is in closer proximity to other text elements that match other portions of the table element is kept and identified as the matching portion. For example, in FIG. 4, the text element "useful life" 402B is in close proximity to the text element "Estimated" 401B. Thus, the system identifies these two text elements 401B and 402B as the text elements matching the table element 401A, as opposed to another text element having the same words.

Another complication that can occur with substring matching is that text elements for some of the table element portions may be found, but other text elements matching the remaining table element portions are not found, for example, within a predetermined number of lines within the unstructured document. In this case, the system will remove all the text elements that have been identified as matching portions of the table element and start again with the text elements that were previously identified as already tried.

Once the system has found matches for all or a predetermined number of table elements at either 103 or 105, the system annotates the native table in the structured document at 104. To trigger the annotation, the system may determine that either all of the table elements have been matched or a predetermined number of table elements have been matched. For example, the system may have a default threshold or a user may set a threshold number of matches or percentage of matches that must be made before the document should be annotated for use as a training or testing dataset. As an example, a user may determine that matching 90% of the table elements still results in an annotated table that provides good training or testing data for a machine-learning model.

To generate the annotated version of the table in the structured document, the system annotates the native table based upon the matches between the table elements and text elements. Annotating the native table includes adding tags to each matched table element within the structured document. Each tag designates the location or position of the text element within the unstructured document that has been matched with the table element. The location may include the coordinate location of the text element. Thus, when a computer or processor receives the annotated version of the table in the structured document and the table within the unstructured document, the system can identify the location of a text element that corresponds to a table element. The system can then learn from the documents so that it can accurately identify elements within a table when a table from an unstructured document is received.

Accordingly, once the annotated version is generated, the annotated version and the unstructured document version may be utilized in a training or testing dataset for a machine-learning model. In a training application, both the annotated version of the structured document and the unstructured document would be provided within the training dataset. This allows the machine-learning model to identify correlations between the structured and unstructured versions and elements within the native and non-native tables. The machine-learning model can then use this knowledge to accurately classify elements within tables when a new unstructured document including a table is received by the machine-learning model. In a testing application, the unstructured document would be provided to an already-trained machine-learning model. The output of the machine-learning model with respect to the unstructured document is then compared to the annotated version of the structured document to see how accurately the machine-learning model is classifying elements within tables of unstructured documents.

Thus, the described system and method provides a technical improvement to current techniques for annotating tables for machine-learning models. Rather than requiring time extensive, tedious, and error-prone manual labeling of tables, the described system and method provides an automated technique for creating table training and testing datasets. The system is able to automatically annotate tables in structured documents based upon matching tables in unstructured documents. These annotations then provide information regarding tables in unstructured documents that can be used to train or test machine-learning models. Accordingly, the described system and method is more accurate and significantly less labor intensive than conventional manual techniques for creating the table training or testing datasets.

Figure 5:
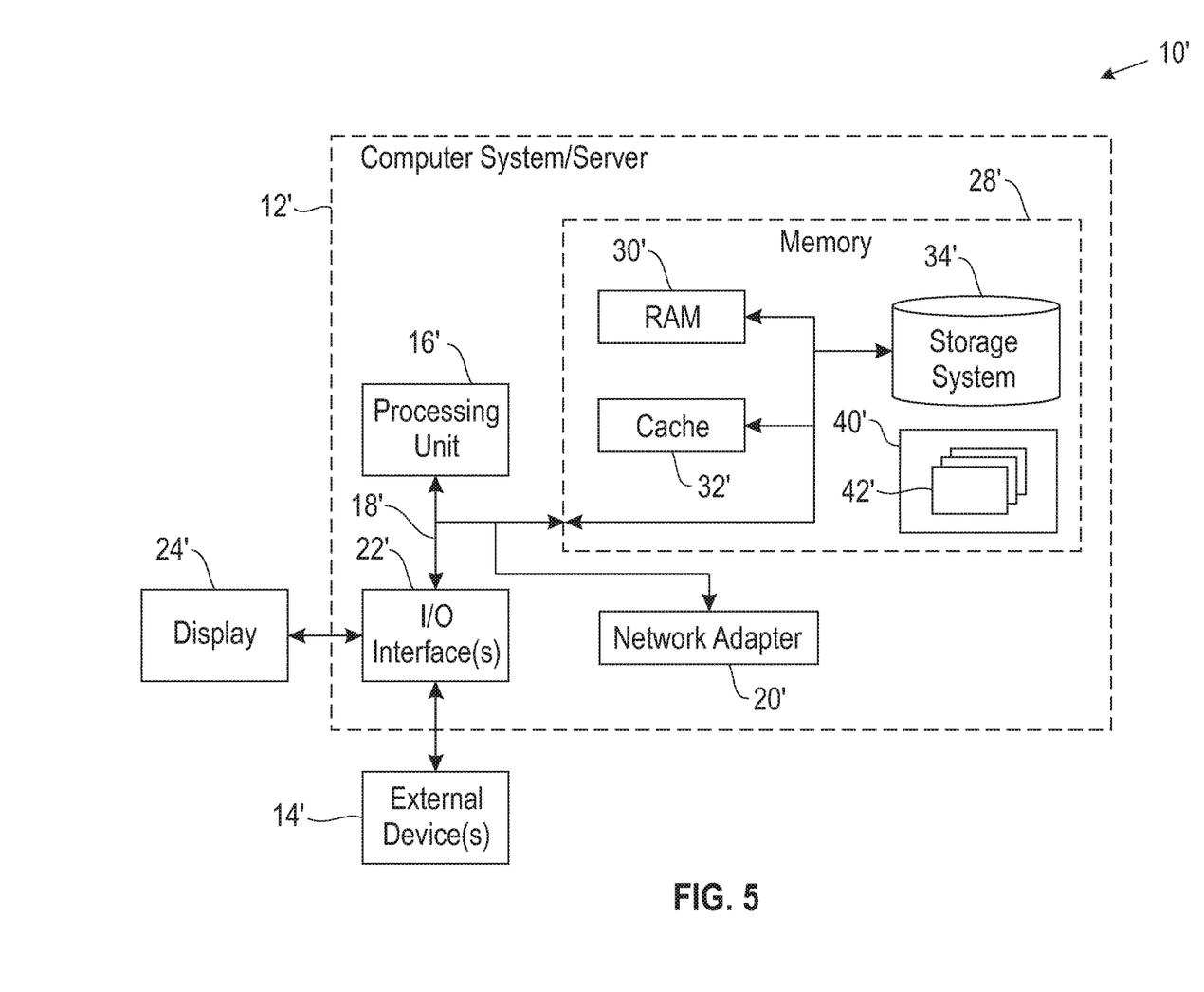
FIG. 5 illustrates a computer system.

As shown in FIG. 5, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
  receiving two documents, one of the two documents having at least one table that includes the same information as a corresponding table in the other of the two documents, wherein (i) one of the two documents comprises the at least one table in an unstructured table representation and (ii) the other of the two documents comprises the at least one table in a structured table representation;

identifying text elements within the at least one table in the unstructured table representation;

matching the identified text elements with table elements within the at least one table in the structured table representation, wherein the matching comprises iteratively (i) identifying an unmatched table element and (ii) finding an unmatched text element occurring first according to a reading direction in the at least one table in the unstructured table representation that matches the identified unmatched table element; and generating an annotated version of the at least one table in the structured table representation by annotating the at least one table in the structured table representation based upon matches between the table elements and the identified text elements, wherein the annotating comprises adding tags to the at least one table in the structured table representation that identify a location of the corresponding text element within the at least one table in the unstructured table representation.

2. The method of claim 1, wherein the identifying comprises converting the unstructured table representation to machine text.

3. The method of claim 1, comprising sorting the identified text elements based upon a reading direction, wherein the reading direction comprises text elements from left to right and from top to bottom.

4. The method of claim 1, wherein the matching comprises (i) identifying a given text element having no exact match with a table element, (ii) identifying a portion of the given text element matching an unmatched table element, and (iii) splitting the given text element into the portion matching the unmatched table element and a second portion not matching the unmatched table element.

5. The method of claim 4, comprising identifying the second portion as an unmatched text element.

6. The method of claim 1, wherein the matching comprises (i) identifying a given text element having no exact match with a table element, (ii) identifying a first text element matching a portion of an unmatched table element, (iii) identifying a second text element matching a second portion of the unmatched table element, and (iv) combining the first text element and the second text element into a text element matching the unmatched table element.

7. The method of claim 6, wherein the matching comprises (i) identifying a text element (a) matching a portion of a table element that has already been matched with a previous text element and (b) having a closer coordinate location to the portion of the table element than the previous text element and (ii) replacing the previous text element with the text element having the more similar coordinate location.

8. The method of claim 1, wherein the location comprises a coordinate location.

9. The method of claim 1, comprising utilizing the annotated version within at least one of a testing dataset for a machine-learning model and a training dataset for a machine-learning model.

10. An apparatus, comprising:

at least one processor; and a computer readable storage medium having computer readable program code embodied therewith and executable by the at least one processor, the computer readable program code comprising:

computer readable program code configured to receive two documents, one of the two documents having at least one table that includes the same information as a corresponding table in the other of the two documents, wherein (i) one of the two documents comprises the at least one table in an unstructured table representation and (ii) the other of the two documents comprises the at least one table in a structured table representation;

computer readable program code configured to identify text elements within the at least one table in the unstructured table representation;

computer readable program code configured to match the identified text elements with table elements within the at least one table in the structured table representation, wherein the matching comprises iteratively (i) identifying an unmatched table element and (ii) finding an unmatched text element occurring first according to a reading direction in the at least one table in the unstructured table representation that matches the identified unmatched table element; and computer readable program code configured to generate an annotated version of the at least one table in the structured table representation by annotating the at least one table in the structured table representation based upon matches between the table elements and the identified text elements, wherein the annotating comprises adding tags to the at least one table in the structured table representation that identify a location of the corresponding text element within the at least one table in the unstructured table representation.

11. A computer program product, comprising:

a computer readable storage medium having computer readable program code embodied therewith, the computer readable program code executable by a processor and comprising:

computer readable program code configured to receive two documents, one of the two documents having at least one table that includes the same information as a corresponding table in the other of the two documents, wherein (i) one of the two documents comprises the at least one table in an unstructured table representation and (ii) the other of the two documents comprises the at least one table in a structured table representation;

computer readable program code configured to identify text elements within the at least one table in the unstructured table representation;

computer readable program code configured to match the identified text elements with table elements within the at least one table in the structured table representation, wherein the matching comprises iteratively (i) identifying an unmatched table element and (ii) finding an unmatched text element occurring first according to a reading direction in the at least one table in the unstructured table representation that matches the identified unmatched table element; and computer readable program code configured to generate an annotated version of the at least one table in the structured table representation by annotating the at least one table in the structured table representation based upon matches between the table elements and the identified text elements, wherein the annotating comprises adding tags to the at least one table in the structured table representation that identify a location of the corresponding text element within the at least one table in the unstructured table representation.

12. The computer program product of claim 11, comprising sorting the identified text elements based upon a reading direction, wherein the reading direction comprises text elements from left to right and from top to bottom.

13. The computer program product of claim 11, wherein the matching comprises (i) identifying a given text element having no exact match with a table element, (ii) identifying a portion of the given text element matching an unmatched table element, and (iii) splitting the given text element into the portion matching the unmatched table element and a second portion not matching the unmatched table element.

14. The computer program product of claim 13, comprising identifying the second portion as an unmatched text element.

15. The computer program product of claim 11, wherein the matching comprises (i) identifying a given text element having no exact match with a table element, (ii) identifying a first text element matching a portion of an unmatched table element, (iii) identifying a second text element matching a second portion of the unmatched table element, and (iv) combining the first text element and the second text element into a text element matching the unmatched table element.

16. The computer program product of claim 15, wherein the matching comprises (i) identifying a text element (a) matching a portion of a table element that has already been matched with a previous text element and (b) having a closer coordinate location to the portion of the table element than the previous text element and (ii) replacing the previous text element with the text element having the more similar coordinate location.

17. The computer program product of claim 11, comprising utilizing the annotated version within at least one of testing data for a machine-learning model and training data for a machine-learning model.

18. A method, comprising:
receiving two representations of at least one table, wherein one of the two representations comprises a non-native table representation and wherein the other of two representations comprises a native table representation, wherein the non-native table representation comprises a table in an unstructured format and wherein the native table representation comprises a table in a structured format;
identifying text tokens comprising text within the non-native table representation;
matching the identified elements with table tokens of the table within the native table representation, wherein the matching comprises identifying text tokens having text matching table tokens, wherein the matching comprises iteratively (i) identifying an unmatched table token and (ii) finding an unmatched element occurring first according to a reading direction in the non-native table representation that matches the identified unmatched element; and
adding tags to the table tokens within the native table representation, wherein a given tag identifies a location of a text token within the non-native table representation corresponding to the table token having the given tag.

19. A computer-implemented method for use with a structured document A and an unstructured document B, the method comprising:
(a) finding content in document B that is similar to a table T1 in document A, by identifying content that is common to both documents A and B, wherein the table T1 includes at least two cells;
(b) inferring the presence of a table T2 in document B, in view of the common content;
(c) for each cell in table T1, identifying content in table T2 that corresponds to content in that cell in table T1, by matching text snippets from tables T1 and T2 in view of a similarity threshold, thereby identifying one or more cells within T2, wherein if text in a given cell in table T1 does not match any text snippet in table T2, then all snippets in T2 that have not been matched to a cell in T1 are checked against the text in the given cell to determine if it is a superstring of text in the given cell of T1, and if so, the text of the superstring is split and matched to text in the given cell;
(d) determining the boundary of table T2, by aggregating the cells identified in T2 and then identifying the extrema of the aggregated cells; and
(e) repeating steps (a) through (d) for additional tables in document A, thereby identifying tables and corresponding cells in document B.

20. The computer-implemented method of claim 19, wherein optical character recognition (OCR) is employed to extract text from the unstructured document B.

21. The computer-implemented method of claim 19, wherein document A has an html format, and document B has a PDF format.

22. The computer-implemented method of claim 19, wherein if text in a given cell in table T1 does not match any text snippet in table T2, then all snippets in table T2 that have not been matched to a cell in T1 are checked against the text in the given cell in table T1 to determine if it is a substring of text in the given cell in T1, and if so, the text of the substring is appended to a running tally of partially matched text substrings, thereby keeping track of any substring snippets that have been matched, and then matching combined snippets to the given cell in T1.

* * * * *